United States Patent
Taylor et al.

[11] Patent Number: 5,958,660
[45] Date of Patent: Sep. 28, 1999

[54] HYDROPHILIC COLLOID COMPOSITION

[75] Inventors: Jeffrey F. Taylor, Fairport; Tien-teh Chen, Penfield; Hwei-Ling Yau, Rochester; Elmer C. Flood, Canandaigua; Lan B. Thai, Penfield, all of N.Y.

[73] Assignee: Eastman Kodak Company, Rochester, N.Y.

[21] Appl. No.: 09/001,987

[22] Filed: Dec. 31, 1997

[51] Int. Cl.⁶ .............................. G03C 1/30; G03C 1/38; G03C 1/053; G03C 1/047
[52] U.S. Cl. ......................... 430/537; 430/531; 430/536; 430/621; 430/622; 430/623; 430/627; 430/628
[58] Field of Search .................................... 430/621, 622, 430/623, 627, 628, 536, 537, 531

[56] References Cited

U.S. PATENT DOCUMENTS

| | | | |
|---|---|---|---|
| 3,642,486 | 2/1972 | Burness et al. | 430/622 |
| 3,841,872 | 10/1974 | Burness et al. | 430/622 |
| 4,161,407 | 7/1979 | Campbell | 430/622 |
| 4,460,680 | 7/1984 | Ogawa et al. | 430/621 |
| 4,481,284 | 11/1984 | Ogawa et al. | 430/621 |
| 4,670,377 | 6/1987 | Miyoshi et al. | 430/621 |
| 4,897,344 | 1/1990 | Okamura et al. | 430/622 |
| 4,975,360 | 12/1990 | Sasaki et al. | 430/512 |
| 5,071,736 | 12/1991 | Ikenone et al. | 430/622 |
| 5,593,809 | 1/1997 | Kim et al. | 430/215 |
| 5,800,977 | 9/1998 | Taylor et al. | 430/621 |

OTHER PUBLICATIONS

A Co–pending application Serial No. 08/686,082 (our docket No. 73838) filed Jul. 24, 1996, entitled Hardening a Hydrophilic Colloid Composition, Inventor(s) Jeffrey Taylor, Tien–teh Chen, Hwei–Ling Yau, Elmer Flood, Lan Thai.

D. M. Burness and J. Pouradier, 1987, *The Theory of Photographic Process*, 4th Edition, edited by T. H. James Macmillan Publishing Company, New York 1977, p. 84.

P. I. Rose, *The Theory of Photographic Process*, 4th edition, edited by T. H. James Macmillan Publishing Company, New York, 1977, pp. 51–65.

Primary Examiner—Richard L. Schilling
Attorney, Agent, or Firm—Edith A. Rice

[57] ABSTRACT

This invention comprises a composition containing a hydrophilic colloid and a water soluble polymer of boric acid, and optionally a hardening agent for the hydrophilic colloid. The hydrophilic colloid is preferably gelatin. This invention also comprises a photographic element in which at least one layer thereof contains a hydrophilic colloid and a water-soluble polymer of boric acid and a method of making the photographic element.

9 Claims, 1 Drawing Sheet

FIG 1

HYDROPHILIC COLLOID COMPOSITION

FIELD OF THE INVENTION

This invention relates to an aqueous hydrophilic colloid composition containing a rheology modifier and, optionally, a hardener for the hydrophilic colloid; a photographic element containing said hydrophilic colloid composition; and a method of making said photographic element.

BACKGROUND OF THE INVENTION

A hydrophilic colloid, such as gelatin, is one of the major components of a photographic emulsion. There a numerous features that gelatin contains that make it a desirable material for use in this type of application. Gelatin is water soluble and can be coated from an aqueous solution. It contains chemical sites that may be crosslinked, that leave the coated product with a sufficient durability. Additionally, the gelatin is hydrophilic, and thus, it will allow developer solutions to penetrate and diffuse into the photographic material when processed using an aqueous processing composition. Each of these features are important to the success and performance of the photographic product.

Gelatin can be coated from an aqueous solution. One of the parameters to control is the Theological properties or viscosity of the solution. When a gelatin solution is prepared, the Theological properties can be modified by the use of certain polymeric additives or thickeners. One standard thickener used for photographic packages is polystyrene sulfonate.

Once a gelatin coating is prepared, chemical hardening is critical. It is the chemical hardening that renders the coating insoluble, and provides the required durability. Chemical hardening of gelatin can be carried out by various means. Hardeners can be either inorganic or organic in nature. A typical inorganic hardening agent is $Ca^{++}$ or other divalent cations. Typical organic species are aldehyde, s-triazines, epoxides, isocyanates, active olefins and sulfone based hardeners to name a few [P. I. Rose, The Theory of Photographic Process, 4th Edition, edited by T. H. James (Macmillan Publishing Company, New York, 1977) p. 51–65]. Vinyl-sulfone hardeners are used to harden gelatin in the manufacture of photographic products various layers of the product. The use of vinyl-sulfones as hardeners in photographic elements is described in, for example, U.S. Pat. Nos. 3,642, 486, 3,841,872, 4,670,377, 4,897,344, 4,975,360 and 5,071, 736. Of particular interest are 1,2-bis(vinyl-sulfonyl) methane (BVSM), 1,2-bis(vinyl-sulfonyl)methane ether (BVSME) and 1,2-bis(vinyl-sulfonyl acetoamide) ethane (BVSAE).

The use of polymeric hardeners in a gelatin system has been reported in the literature. See D. M. Burness and J. Pouradier, 1987 (The Theory of Photographic Process, 4th Edition, edited by T. H. James Macmillan Publishing Company, New York, 1977, p. 84) which discloses several polymers that are active hardeners, e.g. particularly acetylated cellulose, copolymers of glycidyl acrylates, amino polymers containing chlorotriazine pendant groups. Several polymeric hardeners containing vinyl-sulfonyl side groups have been disclosed for use in hardening gelatin. See, for example U.S. Pat. Nos. 4,161,407, 4,460,680, and 4,481, 284.

Commonly assigned copending U.S. patent application Ser. No. 08/686,082, filed Jul. 24, 1996 discloses the use of certain borate compounds can enhance the hardening rate when added to a gelatin and chemical hardener solution. The use of borates aid hardening of a total gelatin package. In a multilayer package, it would be expected that the borate compounds of the -082 application will influence all layers and not be layer specific. In the above cited patent application, the use of polymeric hardeners in combination with borate compounds were used to gain layer specific hardening. Additionally, for any rheological changes, another polymer was required.

PROBLEM TO BE SOLVED BY THE INVENTION

It would be desirable to provide for a rheology modification and, optionally, an enhanced level of chemical hardening rate from the addition of one polymer.

SUMMARY OF THE INVENTION

One aspect of this invention comprises composition comprising a hydrophilic colloid and a water soluble polymer of boric acid.

Another aspect of this invention is a composition comprising a hydrophilic colloid, a water soluble polymer of boric acid and a hardening agent for the hydrophilic colloid.

Yet another aspect of this invention comprises a photographic element comprising a support bearing at least one light sensitive layer and at least one other layer, wherein at least one of said layers comprises a hydrophilic colloid and a water soluble polymer of boric acid and at least one of said layers comprises a hardening agent for the hydrophilic colloid.

Still another aspect of this invention is a method for preparing a photographic element which comprises coating a support with at least one layer comprising an aqueous medium containing a hydrophilic colloid and a water soluble polymer of boric acid and at least one other layer comprising a hydrophilic colloid, wherein at least one of said layers comprises a light sensitive silver halide emulsion, and at least one of said layers contains a hardener for said hydrophilic colloid.

In preferred embodiments of the invention, the hydrophilic colloid is gelatin.

This water soluble polymer of boric acid, when added to hydrophilic colloid composition increases the viscosity ( or acts as a rheology modifier or thickening agent), and/or when combined with a chemical hardening agent for the hydrophilic colloid, the polymer will enhance the hardening reaction.

ADVANTAGEOUS EFFECT OF THE INVENTION

In accordance with this invention, the process of coating an aqueous composition containing a hydrophilic colloid and the durability of the coated product is enhanced. The invention provides improved wet strength to hardened coatings of the hydrophilic colloid composition.

DETAILED DESCRIPTION OF THE INVENTION

As mentioned above, this invention utilizes a water soluble polymer of boric acid. This polymer when added to a gelatin system will increase the viscosity (or act as a rheology modifier or thickening agent), or when combined with a chemical hardening agent, the polymer will enhance the hardening reaction.

Definition of Water-Soluble Polymers Containing Boric Acid

The solubility of the polymer in water is more than 1% at ambient temperature and preferably more than 5% at ambient temperature.

Definition of Boric Acid Monomer

Preferred examples of boric acid containing monomer units which may be used in the present invention include those defined by formula (A)

wherein

R is a hydrogen atom or a substituted or unsubstituted alkyl group, preferably having from 1 to 6 carbon atoms;

Y is wherein R has the same meaning as above;

L is a divalent bonding group, preferably having from 1 to 12 carbon atoms;

wherein R has the same meaning as above; and l, m, and n are each independently 0 or 1.

Preferred embodiments of the boric acid group containing monomers of said formula (A) are explained in greater detail in the following description.

R represents hydrogen atom or a substituted or unsubstituted alkyl group, preferably having from 1 to 6 carbon atoms, such as methyl group, ethyl group, n-propyl group, iso-propyl group, n-butyl group, tert-butyl group, iso-butyl group, sec-butyl group, n-amyl group, tert-amyl group, or n-hexyl group. Substituents include, for example halogen, in paticular, chloro or fluoro, alkoxy groups, preferably having 1 to 6 carbon atoms, and aryl groups, such as phenyl, and the like. In preferred embodiments of the invention, R is a hydrogen atom, a methyl group or an ethyl group.

As set forth above, Y represents wherein R is selected from the group as mentioned above.

In preferred embodiments of the invention, Y is, for example,

In other preferred embodiments of the invention Y is, for example,

L represents a divalent bonding group having from 1 to 12 carbon atoms, for example, an alkylene group such as methylene group, ethylene group, methylmethylene group, dimethylmethylene group, trimethylene group, tetramethylene group, pentamethylene group, hexamethylene group, octamethylene group, or decamethylene group; or an arylene group such as o-phenylene group, m-phenylene group, p-phenylene group, or naphthylene group; or or —A—CO—D
(in which R has the same meaning as above, and A and D independently represent an alkylene group, preferably having from 1 to 10 carbon atoms or an arylene group, preferably having from 6 to 10 carbon atoms), such as
—$CH_2NHCOCH_2$—
—$CH_2NHCOCH_2CH_2$—
—$CH_2CH_2NHCOCH_2$—
—$CH_2CH_2CH_2NHCOCH_2CH_2$—

—$CH_2OCOCH_2$—,

—CH₂OCOCH₂CH₂—
—CH₂CH₂OCOCH₂—,
—CH₂CH₂OCOCH₂CH₂—,
and
—CH₂CH₂CH₂OCOCH₂CH₂—,

Some of the hydrogen atoms in said alkylene group and arylene group may, optionally, be substituted by an aryl group (such as a phenyl group, or a tolyl group), nitro group, hydroxyl group, cyano group, an alkoxy group (such as a methoxy group), an aryloxy group (such as a phenoxy group), an alkylcarbonyloxy group (such-as an acetoxy group), an arylcarbonyloxy group (such as a benzoyloxy group), an alkylcarbonylamino group (such as an acetylamino group), an arylcarbonylamino group (such as a benzoylamino group), a r-arbamoyl group, an alkylcarbamoyl group (such as a methylcarbamnoyl group or ethylcarbamoyl group), a dialkylcarbamoyl group (such as a dimethylcarbamoyl group), an arylcarbamoyl group (such as a phenylcarbamoyl group), an alkylsulfonyl group (such as a methylsulfonyl group), an arylsulfonyl group (such as a phenylsulfonyl group), an alkylsulfonamido group (such as a methanesulfonamido group), an arylsulfonamido group (such as a phenylsulfonamido group), a sulfamoyl group, an alkylsulfamoyl group (such as an ethylsulfamoyl group), a dialkylsulfamoyl group (such as a dimethylsulfamoyl group), an arylsulfamoyl group, carboxyl group, an alkoxycarbonyl group (such as methoxycarbonyl group), a halogen atom (such as a fluorine atom, chlorine atom, bromine atom), etc.

L is especially preferably a methylene group, ethylene group, methylmethylene group, dimethylmethylene group, trimethylene group, tetramethylene group, pentamethylene group, m-phenylene group, p-phenylene group, —CH₂NHCCOCH₂—, —CH₂NHCOCH₂CH₂—, —CH₂OCOCH₂CH₂—, or —CH₂CH₂OCOCH₂CH₂—

X represents —O—, —CO—, —CO₂—, —SO₂—, wherein R has the same meaning as above.

In particularly preferred embodiments of the invention X is —O—, —CO—, —CO₂—, —SO₂—, —CONH—, —NHCONH—, —NHCO₂—, —NHCOCH₂CH₂, or —SO₂CH₂CH₂—.

Preferred examples of boric acid containing monomers are listed below.

B-1

B-2

B-3

B-4

B-5

B-6

2. Definition of Polymers

One method to gain the required water solubility of the boric acid containing polymers is to include an ionizable monomer defined in formula (B), wherein R has the same meaning as defined above for monomers of formula (A); U represents a divalent bonding group containing from 1 to 20 carbon atoms and r is 0 or 1. R is especially preferably a hydrogen atom, methyl group, or ethyl group. U represents a divalent bonding group having 1 to 20 carbon atoms, for example, an alkylene group(such as a methylene group, ethylene group, trimethylene group, or hexamethylene group), a phenylene group(such as an o-phenylene group, p-phenylene group, or m-phenylene group), an arylene-alkylene group, —$CO_2$—, —$CO_2$— $R_1$- (wherein $R_1$ represents an alkylene group, a phenylene group or an arylenealkylene group), —CONH—$R_1$-(in which $R_1$ has the same meaning as above), or —CONR— $R_1$-(in which R and $R_1$ have the same meaning as described above). Z is a strong acid group or salt thereof, such as sulfonic acid, sulfuric acid, sulfinic acid, or phosphoric acid, or a salt thereof, such as, a sodium or potassium salt.

Preferred examples of formula (B) are set of forth below.

$$CH_2=CH-P(O)(OH)_2 \quad \text{S-16}$$

Polymers of boric acids which may be used in the present invention may additionally contain other monomers in addition to the boric acid group-containing monomers of the above-described formula (A) and the ionic group containing monomers of the above-described formula (B).

Preferred examples of monomers useful for forming said additional monomers are ethylene, propylene, 1-butnene, styrene, a-methylstyrene, vinyltoluene, sodium vinylsulfonate; and mono-ethylenic unsaturated esters of fatty acids (such as vinyl acetate, allyl acetate), monoethylenic unsaturated amides of fatty acids (such as N-vinylacetamide, N-vinylpyrrolidone), ethylenic unsaturated monocarboxylic acid or dicarboxylic acid esters (such as methyl acrylate, ethyl acrylate, hydroxyethyl acrylate, methyl methacrylate, n-butyl methacrylate, benzyl acrylate, 2-ethylhexyl acrylate, cyclohexyl methacrylate, furfuryl acrylate, diethyl maleate, diethyl itaconate), ethylenic unsaturated monocarboxlic acid amides (such as acrylamide, dimethyl-acrylamide, methacrylamide, diacetoneacrylamide, acryloyl-morpholine, sodium acrylamide-2-methylpropane-sulfonate, methacryloylmorpholine), mono-ethylenic unsaturated compounds (such as acrylonitrile), and dienes (such as butadiene, isoprene); and in particular, highly hydrophilic compounds are especially preferred among them.

In the boric acid-containing polymers of the present invention, the content of the boric acid group containing monomer is preferably from 20 to 98 wt. % and especially preferably from 30 to 90 wt. %; the content of the strong acid containing monomer is preferably from 2 to 70 wt. % and more preferably from 5 to 50 wt. %; and the content of other additional monomer(s) is preferably 70 wt. % or less.

The polymer containing boric acid groups of the present invention preferably have a molecular weight of from $5 \times 10^3$ to $1 \times 10^7$. If the molecular weight is too small, the polymer is apt to easily move, but on the contrary, if the molecular weight is too large, the polymer is difficult to coat on a photographic support. The preferred molecular weight of the polymers falls within the range of from $1 \times 10^4$ to $2 \times 10^6$.

Preferred examples of the polymers which may be used in the present invention are set forth below.

| Polymer I.D. | Composition | Wt. Ratio |
| --- | --- | --- |
| P-1 | B-1: S-1 | 50:50 |
| P-2 | B-1: S-1 | 60:40 |
| P-3 | B-1: S-1 | 70:30 |
| P-4 | B-1: S-1 | 40:60 |
| P-5 | B-1: S-1 | 75:25 |
| P-6 | B-1: S-1: 2-hydroxyethyl methacrylate | 50:30:20 |
| P-7 | B-1: S-1: 2-hydroxyethyl methacrylate | 60:20:20 |
| P-8 | B-1: S-1: n-butyl acrylate | 60:20:20 |
| P-9 | B-1: S-1: acrylamide | 50:30:20 |
| P-10 | B-1: S-1: ethyl acrylate | 60:20:20 |
| P-11 | B-1: S-1: 2-hydroxyethyl acrylate | 60:20:20 |
| P-12 | B-2: S-1 | 50:50 |
| P-13 | B-2: S-1 | 60:40 |
| P-14 | B-2: S-1 | 70:30 |
| P-15 | B-2: S-1 | 40:60 |
| P-16 | B-2: S-1 | 75:25 |
| P-17 | B-2: S-1: 2-hydroxyethyl methacrylate | 50:30:20 |
| P-18 | B-2: S-1: 2-hydroxyethyl methacrylate | 60:20:20 |
| P-19 | B-2: S-1: n-butylacrylate | 60:20:20 |
| P-20 | B-2: S-1: acrylamide | 50:30:20 |
| P-21 | B-2: S-1: ethyl acrylate | 60:20:20 |
| P-22 | B-2: S-1: 2-hydroxyethyl acrylate | 60:20:20 |
| P-23 | B-1: S-3 | 50:50 |
| P-24 | B-1: S-3 | 60:40 |
| P-25 | B-1: S-3 | 70:30 |
| P-26 | B-1: S-3 | 40:60 |
| P-27 | B-1: S-3 | 75:25 |
| P-28 | B-1: S-3: 2-hydroxyethyl methacrylate | 50:30:20 |
| P-29 | B-1: S-3: 2-hydroxyethyl methacrylate | 60:20:20 |
| P-30 | B-1: S-3: n-butyl acrylate | 60:20:20 |
| P-31 | B-1: S-3: acrylamide | 50:30:20 |
| P-32 | B-1: S-3: ethyl acrylate | 60:20:20 |
| P-33 | B-1: S-3: 2-hydroxyethyl acrylate | 60:20:20 |
| P-34 | B-1: S-1: methacrylamide | 50:30:20 |
| P-35 | B-2: S-1: methacrylamide | 50:30:20 |
| P-36 | B-1: S-3: methacrylamide | 50:30:20 |
| P-37 | B-3: S-1 | 50:50 |
| P-38 | B-4: S-7 | 50:50 |
| P-39 | B-4: S-8 | 50:50 |
| P-40 | B-7: S-3 | 50:50 |
| P-41 | B-7: S-9 | 50:50 |
| P-42 | B-9: S-3 | 50:50 |
| P-43 | B-9: S-9 | 50:50 |
| P-44 | B-11: S-1 | 50:50 |
| P-45 | B-15: S-3 | 50:50 |
| P-46 | B-20: S-3 | 50:50 |
| P-47 | B-20: S-9 | 50:50 |
| P-48 | B-20: S-3: 2-hydroxyethyl acrylate | 50:30:20 |
| P-49 | B-20: S-3: acrylamide | 50:30:20 |
| P-50 | B-20: S-1: 2-hydroxyethyl acrylate | 50:30:20 |

Suitable hydrophilic colloid materials that can be used in the present invention include both naturally occurring substances such as proteins, protein derivatives, cellulose derivatives—e.g., cellulose esters, gelatin—e.g., alkali-treated gelatin (cattle bone or hide gelatin) or acid-treated gelatin (pigskin gelatin), gelatin derivatives—e.g., acetylated gelatin, phthalated gelatin and the like, polysaccharides such as dextran, gum arabic, zein, casein, pectin, collagen derivatives, collodion, agar-agar, arrowroot, albumin and the like.

The water-soluble polymer comprising a boric acid group preferably is added to a composition comprising a hydrophilic colloid in an amount of about 0.1 to about 50 wt. %, based on the weight of the hydrophilic colloid, more preferably about 1 to about 20 wt. %.

The hardener used in the hydrophilic colloid composition of this invention can be can be either inorganic or organic in nature. A typical inorganic hardening agent is $Ca^{++}$ or other divalent cations. Typical organic species are aldehyde, epoxides, isocyanates, pyridinium ethers, carbamoyl- and carbamoyloxy-pyridinium ions, active olefins and sulfone based hardeners.

In preferred embodiments of the invention, the hardener is a vinyl-sulfone hardener. Vinyl-sulfone hardeners are well known. Typical vinyl-sulfone hardeners are described in U.S. Pat. Nos. 3,490,911, 3,539,644, 3,642,486, 3,841,872, 4,670,377, 4,897,344, 4,975,360 and 5,071,736, the entire disclosures of which are incorporated herein by reference.

Preferred vinyl-sulfone hardeners for use in the present invention are represented by Formula (C) indicated below:

$$X^1-SO_2-L^1-SO_2-X^2 \quad \text{(C)}$$

wherein $X^1$ and $X^2$ represent $-CH=CH_2$ or $-CH_2CH_2-Y^1$ groups, and $X^1$ and $X^2$ may be the same or different; $Y^1$ represents a group which can be substituted by a nucleophilic reagent having a nucleophilic group, or a group which can be eliminated in the form of $HY^1$ by means of a base; and $L^1$ is a divalent linking group which may be substituted.

The film hardening agent of the present invention represented by Formula (C) is described in detail below. Therein, $X^1$ and $X^2$ represent —CH=CH$_2$ or —CH$_2$CCH$_2$—Y$^1$ groups, wherein $Y^1$ is a group which is substituted or eliminated by the action of a nucleophilic reagent or a base such as those having an amino group or a hydroxy group, and preferred examples of the groups $X^1$ and $X^2$ are indicated below.

further substituted with one or more groups represented by $X^3$—SO$_2$—. Here, $X^3$ has the same significance as $X^1$ and $X^2$ described above.

The groups indicated below are typical examples of the linking group $L^1$. In these examples, a–k are integers of from 1 to 6. Of these, e can also have a value of zero, but e is preferably 2 or 3. The values of a–k except e are preferably 1 or 2, and most desirably are 1. In these formulae, $R^2$ —CH=CH$_2$,  —CH$_2$CH$_2$—Cl
—CH$_2$CH$_2$—Br,  —CH$_2$CH$_2$—OSO$_2$CH$_3$
—CH$_2$CH$_2$—OSO$_2$C$_6$H$_5$,  —CH$_2$CH$_2$—OSO$_2$C$_6$H$_4$—CH$_3$
—CH$_2$CH$_2$—OSO$_3$Na,  —CH$_2$CH$_2$—OSO$_3$K
—CH$_2$CH$_2$—OCOCH$_3$,  —CH$_2$CH$_2$—OCOCF$_3$ —CH$_2$CH$_2$OCOCHCl$_2$ Particularly preferred examples of the groups $X^1$ and $X^2$ are indicated below.

preferably represents a hydrogen atom, or an alkyl group having from 1 to 6 carbon atoms, and most desirably —CH=CH$_2$,  —CH$_2$CH$_2$—Cl
—CH$_2$CH$_2$—Br,  —CH$_2$CH$_2$—OSO$_2$CH$_3$
—CH$_2$CH$_2$—OSO$_2$CH$_3$,  —CH$_2$CH$_2$—OSO$_3$Na
—CH$_2$CH$_2$OSO$_3$K

The group —CH=CH$_2$ is the most desirable for $X^1$ and $X^2$.

The divalent linking group $L^1$ is a divalent group having up to 30 carbon atoms, preferably up to 10 carbon atoms, and comprising an alkylene group (including cycloalkylene groups), an arylene group (including heterocyclic aromatic groups such as 5- to 7-membered ring groups containing 1 to 3 hetero atoms (e.g., a divalent group derived from thiadiazole or pyridine) or combinations of these groups with one or more units represented by —O—, —NR$^2$—, —SO$_2$—, —SO$_3$—, —S—, —SO, —SO$_2$NR$^2$—, —CO—, —COO—, —CONR$^2$—, —NR$^2$COO— and NR$^2$CONR$^2$—, where, $R^2$ represents hydrogen or an alkyl group having from 1 to 15 carbon atoms, an aryl group or an aralkyl group. The $R^2$ groups may be joined together to form ring structures when the linking group includes two or more units of —NR, —SO$_2$NR$^2$—, —CONR$^2$—, —NR$^2$COO— and —NR$^2$CONR$^2$—.

Moreover, $L^1$ may also be substituted by, for example, hydroxyl groups, alkoxy groups, carbamoyl groups, sulfamoyl group, sulfo groups or salts thereof, carboxyl groups or salts thereof, halogen atoms, alkyl groups, aralkyl groups and aryl groups. Furthermore, the substituent groups may be represents a hydrogen atom, a methyl group or an ethyl group. $L^1$ is preferably:

—(CH$_2$)$_a$—
—(CH$_2$)$_b$—O—(CH$_2$)$_c$—
—(CH$_2$)$_d$—CONR$^2$—(CH$_2$)$_e$—NR$^2$CO—(CH$_2$)$_f$—
—(CH$_2$)$_g$—SO$_2$—(CH$_2$)$_h$—

Typical nonlimiting examples of the film hardening agents for use in the present invention are indicated below.

H-1: CH$_2$=CHSO$_2$CH$_2$SO$_2$CH=CH$_2$
H-2: CH$_2$=CHSO$_2$CH$_2$OCH$_2$SO$_2$CH=CH$_2$
H-3: CH$_2$=CHSO$_2$CH$_2$CH$_2$SO$_2$CH=CH$_2$
H-4: CH$_2$=CHSO$_2$CH$_2$CH(OH)CH$_2$SO$_2$CH=CH$_2$
H-5: CH$_2$=CHSO$_2$CH$_2$CONHCH$_2$CH$_2$NHCOCH$_2$SO$_2$CH=CH$_2$
H-6: CH$_2$=CHSO$_2$CH$_2$CONHCH$_2$CH$_2$CH$_2$NHCOCH$_2$SO$_2$CH=CH$_2$

H-7:

H-8:

H-9:

H-10:

H-11: (CH$_2$=CHSO$_2$CH$_2$)$_3$CCH$_2$SO$_2$CH$_2$CH$_2$NHCH$_2$CH$_2$SO$_3$Na
H-12: (CH$_2$=CHSO$_2$)$_2$CHCH$_2$CH$_2$—C$_6$H$_4$—SO$_3$Na

The vinyl-sulfone hardener is preferably a non-polymeric bis(vinyl-sulfone) such as bis(vinyl-sulfonyl) methane (BVSM) bis(vinyl-sulfonyl methyl) ether BVSME or 1,2-bis(vinyl-sulfonyl acetoamide)ethane (BVSAE), etc.

The non-polymeric vinyl-sulfone hardener preferably has a molecular weight of less than 10,000. More preferably the non-polymeric vinyl-sulfone hardener has a molecular weight of about 100 to about 5,000.

In other embodiments of the invention the vinyl-sulfone hardener is polymeric, such as the polymeric hardeners disclosed in U.S. Pat. Nos. 4,161,407, 4,460,680 and 4,481,284, the entire disclosures of which are incorporated herein by reference.

Preferred polymeric vinyl-sulfone hardeners are represented by Formula (D):

wherein A$^1$ is a monomer unit prepared by copolymerizing copolymerizable ethylenically unsaturated monomers, R$^3$ is hydrogen or a lower alkyl group having 1 to 6 carbon atoms; L$^2$ is a bivalent linking group, and R$^4$ is —CH=CH$_2$ or —CHCH$_2$CH$_2^4$, where X$^4$ is a group capable of being substituted with a nucleophilic group or a group capable of being released in the form of HX$^4$ upon addition of a base, and x and y each represents molar percent, x being between 0 and 99 and y being between 1 and 100.

Examples of ethylenically unsaturated monomer represented by A$^1$ of Formula (D) include examples of ethylenically unsaturated monomers represented by "A$^1$" of Formula (D) include ethylene, propylene, 1-butene, isobutene, styrene, chloromethylstyrene, hydroxymethylstyrene, sodium vinylbenzenesulfonate, sodium vinylbenzylsulfonate, N,N,N-trimethyl-N-vinylbenzylammonium chloride, N,N-dimethyl-N-benzyl-N-vinylbenzylammonium chloride, a-methylstyrene, vinyltoluene, 4-vinylpyridine, 2-vinylpyridine, benzyl vinylpyridinium chloride, N-vinylacetamide, N-vinylpyrrolidone, 1-vinyl-2-methylimidazole, monoethylenically unsaturated esters of aliphatic acids (e.g., vinyl acetate and allyl acetate), ethylenically unsaturated mono- or dicarboxylic acids and salts thereof (e.g., acrylic acid, methacrylic acid, itaconic acid, maleic acid, sodium acrylate, potassium acrylate and sodium methacrylate), maleic anhydride, esters of ethylenically unsaturated monocarboxylic or dicarboxylic acids (e.g., n-butyl acrylate, n-hexyl acrylate, hydroxyethyl acrylate, cyanoethyl acrylate, N,N-diethylaminoethyl acrylate, methyl methacrylate, n-butyl methacrylate, benzyl methacrylate, hydroxyethyl methacrylate, chloroethyl methacrylate, methoxyethyl methacrylate, N,N-diethylaminoethyl methacrylate, N,N,N-triethyl-N-methacryloyloxyethylammonium-p-toluene sulfonate, N,N diethyl-N-methyl-N-methacryloyloxy-ethyl ammonium-p-toluene sulfonate, dimethyl itaconate and monobenzyl maleate), and amides of ethylenically unsaturated monocarboxylic or dicarboxylic acids (e.g., acrylamide, N,N-dimethylacrylamide, N-methylolacrylamide, N-(N,N-dimethylaminopropyl)acrylamide, N,N,N-trimethyl-N-(N-acryloylpropyl)ammonium-p-toluene sulfonate, sodium 2-acrylamide-2-methylpropane sulfonate, acryloyl morpholine, methacrylamide, N,N-dimethyl-N'-acryloyl propane diamine propionate betaine, and N,N-dimethyl-N'-methacryloyl propane diamine acetate betaine). "A$^1$" further includes monomers having at least two copolymerizable ethylenically unsaturated groups (e.g., divinylbenzene, methylenebisacrylamide, ethylene glycol diacrylate, trimethylene glycol diacrylate, ethylene glycol dimethacrylate, trimethylene glycol dimethacrylate and neopentyl glycol dimethacrylate).

Examples or $R^3$ of Formula (D) include methyl, ethyl, butyl, tert. butyl, isopropyl, n-hexyl and the like.

Examples of $R^4$ of Formula (D) include the following groups: —CH=CH$_2$—, —CH$_2$CH$_2$Cl—, —CH$_2$CH$_2$Br—, —CH$_2$CH$_2$O$_3$SCH$_3$—, —CH$_2$CH$_2$OH—, —CH$_2$CH$_2$O$_2$CCH$_3$—, —CH$_2$CH$_2$O$_2$CCF$_3$—, —CH$_2$CH$_2$OH—, —CH$_2$CH$_2$O$_2$CCH$_3$—, and CH$_2$CH$_2$O$_2$CCHCl$_2$.

$L^2$ of formula (D) is a bivalent linking group. In one preferred embodiment, $L^2$ is an alkylene group, preferably containing about 1 to 6 carbon atoms, an arylene group, preferably containing about 6 to 12 carbon atoms, —COZ—, or —COZR$^5$—where $R^5$ is an alkylene group, preferably containing about 1 to 6 carbon atoms, or an arylene group, preferably containing about 6 to 12 carbon atoms. Preferably $L^2$ is a phenylene group.

In another preferred embodiment of the invention $L^2$ is preferably a linking group of the formula:

—Q—L$^3$— wherein Q is —CO$_2$— or wherein $R^6$ hydrogen, a lower alkyl group having 1–6 carbon atoms or an arylene group having 6 to 10 carbon atoms; $L^3$ is a divalent group having 3 to 15 carbon atoms and containing at least one linking group selected from the members consisting of —CO$_2$— and wherein $R^7$ is e same as $R^6$ above or a divalent group having 1 to 12 carbon atoms and containing at least one linking group selected from the members consisting of

-continued wherein $R^8$ is hydrogen or a lower alkyl group having 1–6 carbon atoms.

Examples of include the following groups: —CO$_2$—, —CONH—

Examples of $L^3$ include the following groups: —CH$_2$CO$_2$CH$_2$—, —CH$_2$CO$_2$CH$_2$CH$_2$—, CH$_2$CH$_2$CO$_2$CH$_2$CH$_2$—, —(CH$_2$)$_{10}$CO$_2$CH$_2$CH$_2$, —(CH$_2$)$_5$CO$_2$CH$_2$C$_2$, —CH$_2$NHCOCH$_2$—, —CH$_2$NHCOCH$_2$CH$_2$—, —(CH$_2$)$_3$NHCOCH$_2$CH$_2$—, (CH$_2$)$_5$NHCOCH$_2$CH$_2$—, —(CH$_2$)$_{10}$NHCOCH$_2$CH$_2$, —CH$_2$OCH$_2$—, —CH$_2$CH$_2$OCH$_2$CH$_2$CH$_2$—,

—SOCH$_2$CH$_2$-, —CH$_2$SOCH$_2$CH$_2$-, —SO$_2$CH$_2$CH$_2$-,

—SO$_2$CH$_2$CH$_2$SO$_2$CH$_2$CH$_2$-,

—SO$_3$CH$_2$CO$_2$CH$_2$CH$_2$-, —SO$_3$CH$_2$CH$_2$CO$_2$CH$_2$CH$_2$-,

—SO$_2$NHCH$_2$CO$_2$CH$_2$CH$_2$-, —SO$_2$NHCH$_2$CH$_2$CO$_2$CH$_2$CH$_2$-,

—NHCONHCH$_2$CH$_2$-, —CH$_2$NHCONHCH$_2$CH$_2$-,

—NHCO$_2$CH$_2$CH$_2$-, —CH$_2$NHCO$_2$CH$_2$CH$_2$-,

Preferably the vinyl sulfone polymeric hardener comprises repeating units of the formula:

| | | |
|---|---|---|
| PH-1 | —(CH$_2$CH)$_x$—————(CH$_2$CH)$_y$—<br>         $\|$                                    $\|$<br>  CONHC(CH$_3$)$_2$CH$_2$SO$_3$Na   COOCH$_2$CH$_2$OCOCH$_2$SO$_2$CH=CH$_2$ | x/y = 2/1 |
| PH-2 | —(CH$_2$CH)$_x$—————(CH$_2$CH)$_y$—<br>         $\|$                                    $\|$<br>  CONHC(CH$_3$)$_2$CH$_2$SO$_3$Na   CONHCH$_2$NHCOCH$_2$CH$_2$SO$_2$CH=CH$_2$ | x/y = 2/1 |
| PH-3 | —(CH$_2$CH)$_x$—————(CH$_2$CH)$_y$—<br>         $\|$                                    $\|$<br>  CONHC(CH$_3$)$_2$CH$_2$SO$_3$Na   CONH(CH$_2$)$_3$NHCOCH$_2$CH$_2$SO$_2$CH=CH$_2$ | x/y = 2/1 |
| PH-4 | —(CH$_2$CH)$_x$—————(CH$_2$CH)$_y$—<br>         $\|$                                    $\|$<br>  CONHC(CH$_3$)$_2$CH$_2$SO$_3$Na     C$_6$H$_4$-SO$_2$CH$_2$CH$_2$SO$_2$CH=CH$_2$ (para) | x/y = 2/1 |
| PH-5 | —(CH$_2$CH)$_x$—————(CH$_2$CH)$_y$—<br>         $\|$                                    $\|$<br>  CONHC(CH$_3$)$_2$CH$_2$SO$_3$Na     C$_6$H$_4$-SO$_2$CH$_2$CH$_2$SO$_2$CH$_2$CH(OH)CH$_2$SO$_2$CH=CH$_2$ (para) | x/y = 2/1 |
| PH-6 | —(CH$_2$CH)$_x$—————(CH$_2$CH)$_y$—<br>         $\|$                                    $\|$<br>  CONHC(CH$_3$)$_2$CH$_2$SO$_3$Na     C$_6$H$_4$-CH$_2$NHCOCH$_2$CH$_2$SO$_2$CH=CH$_2$ (para) | x/y = 2/1 |
| PH-7 | —(CH$_2$CH)$_x$—————(CH$_2$CH)$_y$—<br>         $\|$                                    $\|$<br>  CONHC(CH$_3$)$_2$CH$_2$SO$_3$Na   NHCONHCH$_2$SO$_2$CH=CH$_2$ | x/y = 2/1 |
| PH-8 | —(CH$_2$CH)$_x$—————(CH$_2$CH)$_y$—<br>         $\|$                                    $\|$<br>  CONHC(CH$_3$)$_2$CH$_2$SO$_3$Na   CONHCOCH$_2$CH$_2$SO$_2$CH=CH$_2$ | x/y = 2/1 |
| PH-9 | —(CH$_2$CH)$_x$—————(CH$_2$CH)$_y$—<br>         $\|$                                    $\|$<br>  CONHC(CH$_3$)$_2$CH$_2$SO$_3$Na   COOCH$_2$CH$_2$OCOCH$_2$SO$_2$CH$_2$CH$_2$Cl | x/y = 2/1 |
| PH-10 | —(CH$_2$CH)$_x$—————(CH$_2$CH)$_y$—<br>         $\|$                                    $\|$<br>  CONHC(CH$_3$)$_2$CH$_2$SO$_3$Na   CONHCH$_2$NHCOCH$_2$CH$_2$SO$_2$CH$_2$CH$_2$Cl | x/y = 2/1 |
| PH-11 | —(CH$_2$CH)$_x$—————(CH$_2$CH)$_y$—<br>         $\|$                                    $\|$<br>  CONHC(CH$_3$)$_2$CH$_2$SO$_3$Na   CONHCH$_2$NHCOCH$_2$CH$_2$SO$_2$CH$_2$CH$_2$B | x/y = 2/1 |

-continued

| | | |
|---|---|---|
| PH-12 | −(CH$_2$CH)$_x$−(CH$_2$CH)$_y$−<br>　　　　│　　　　　　　│<br>　CONHC(CH$_3$)$_2$CH$_2$SO$_3$Na　（C$_6$H$_4$）<br>　　　　　　　　　　　　　│<br>　　　　　CH$_2$NHCOCH$_2$CH$_2$SO$_2$CH$_2$CH$_2$Cl | x/y = 2/1 |
| PH-13 | −(CH$_2$CH)$_x$−(CH$_2$CH)$_y$−<br>　　　　│　　　　　　　│<br>　CONHC(CH$_3$)$_2$CH$_2$SO$_3$Na　（C$_6$H$_4$）<br>　　　　　　　　　　　　　│　　　　OH<br>　　　　　　　　　　　　　│　　　　│<br>SO$_2$CH$_2$CH$_2$SO$_2$CH$_2$CH−CH$_2$SO$_2$CH$_2$CH$_2$Cl | x/y = 2/1 |
| PH-14 | −(CH$_2$CH)$_x$−(CH$_2$CH)$_y$−<br>　　　　│　　　　　　　│<br>CONHC(CH$_3$)$_2$CH$_2$SO$_3$Na　CONHCOCH$_2$CH$_2$SO$_2$CH$_2$CH$_2$Cl | x/y = 2/1 |
| PH-15 | −(CH$_2$CH)$_x$−(CH$_2$CH)$_y$−<br>　　│　　　　　　　│<br>　COOM　　　CONHCH$_2$COCH$_2$CH$_2$SO$_2$CH$_2$CH$_2$Cl | x/y = 2/1 |
| PH-16 | −(CH$_2$CH)$_x$−(CH$_2$CH)$_y$−<br>　　│　　　　　　　│<br>　COOM　　　CONHCH$_2$NHCOCH$_2$CH$_2$SO$_2$CH=CH$_2$ | x/y = 2/1 |
| PH-17 | −(CH$_2$CH)$_x$−(CH$_2$CH)$_y$−<br>　　│　　　　　　　│<br>　COOM　　　（C$_6$H$_4$）−CH$_2$NHCOCH$_2$CH$_2$SO$_2$CH=CH$_2$ | x/y = 2/1 |
| PH-18 | −(CH$_2$CH)$_x$−(CH$_2$CH)$_y$−<br>　　│　　　　　　　│<br>　COOM　　　（C$_6$H$_4$）<br>　　　　　　　　　│<br>　　　　CH$_2$NHCOCH$_2$CH$_2$SO$_2$CH$_2$CH$_2$Cl | x/y = 2/1 |
| PH-19 | −(CH$_2$CH)$_x$−(CH$_2$CH)$_y$−<br>　　│　　　　　　　│<br>　COOM　　　（C$_6$H$_4$）<br>　　　　　　　　　│　　　OH<br>　　　　　　　　　│　　　│<br>SO$_2$CH$_2$CH$_2$SO$_2$CH$_2$CHCH$_2$SO$_2$CH=CH$_2$ | x/y = 2/1 |
| PH-20 | −(CH$_2$CH)$_x$−(CH$_2$CH)$_y$−<br>　　│　　　　　　　│<br>　COOM　　　（C$_6$H$_4$）<br>　　　　　　　　　│　　　OH<br>　　　　　　　　　│　　　│<br>SO$_2$CH$_2$CH$_2$SO$_2$CH$_2$CHCH$_2$SO$_2$CH$_2$CH$_2$Cl | x/y = 2/1 |
| PH-21 | −(CH$_2$CH)$_x$−(CH$_2$CH)$_y$−<br>　　│　　　　　　　│<br>　COOM　　　COOCH$_2$CH$_2$OCOCH$_2$SO$_2$CH=CH$_2$ | x/y = 2/1 |

PH-22  x/y = 2/1

PH-23  x/y = 4/1

In the above formulae, M represents a hydrogen atom, a sodium atom or a potassium atom, and x and y represent the molar percent of the corresponding units charged. The molar percent is not limited to those specified in the above formulae, x may be from 0 to 99, and y may be from 1 to 100.

The molecular weight of the polymer is greater than 10,000. Preferably the molecular weight is in the range of 100,000 to 1,000,000, more preferably 30,000 to 500,000. The amount of vinyl-sulfone hardener is about 0.01 to about 50 wt %, based on the weight of the hydrophilic colloid preferably about 0.5 to about 10 wt % and most preferably about 10 to about 20 wt %, based on the weight of the hydrophilic colloid In a preferred embodiment of the invention a polymeric and a non-polymeric vinyl-sulfone hardener is used to harden a hydrophilic colloid. The amount of polymeric vinyl-sulfone hardener is used in an amount of about 1 to about 3 wt %, preferably about 2 to about 3 wt %, based on the weight of the non-polymeric vinyl-sulfone hardener.

Other hardeners preferred for use in this invention include carbamoyl-and carbamoyloxy-pyridinium hardeners which are disclosed, for example, in U.S. Pat. Nos. 4,063,952, 4,119,464, 4,828,974 and 4,751,173, and Japanese Kokai No. 61/009,641, the entire disclosures of which are incorporated herein by reference. Preferred carbamoyl-and carbamoyloxy-pyridinium hardeners are of the formula:

wherein $R^9$ and $R^{10}$ are independently substituted or unsubstituted alkyl groups, preferably having 1 to 6 carbon atoms or $R^9$ and $R^{10}$ can be joined together with the N atom to form a 5- or 6-heterocyclic ring; $R^{11}$ is a substituted or unsubstituted alkyl group preferably having 1 to 6 carbon atoms, an amino group, an amide group, a sulfo group. $R^9$ and $R^{10}$ are preferably methyl or ethyl groups or together with the N atom to which they are attached form one of the following groups:

$R^{11}$ is preferably a methyl, ethyl, sulfoethyl, sulfopropyl or dimethylamino group.

A particularly preferred carbamoyl hardener is of the formula:

CH-1

Pyridinium hardeners are disclosed, for example, in U.S. Pat. Nos. 5,263,822 and 4,877,724, the entire disclosures of which are incorporated herein by reference. preferred pyridinium hardeners are compounds of the formula:

PYR-1 and

PYR-2

The photographic elements made by the method of the present invention can be black and white single color elements or multicolor elements. Multicolor elements contain dye image-forming units sensitive to each of the three primary regions of the spectrum. Each unit can be comprised of a single emulsion layer or of multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, overcoat layers, subbing layers, and the like. All of these can be coated on a support which can be transparent or reflective (for example, a paper support).

Photographic elements of the present invention may also usefully include a magnetic recording material as described in *Research Disclosure,* Item 34390, November 1992, or a transparent magnetic recording layer such as a layer containing magnetic particles on the underside of a transparent support as in U.S. Pat. Nos. 4,279,945 and 4,302,523. The element typically will have a total thickness (excluding the support) of from 5 to 30 microns. While the order of the color sensitive layers can be varied, they will normally be red-sensitive, green-sensitive and blue-sensitive, in that order on a transparent support, (that is, blue sensitive furthest from the support) and the reverse order on a reflective support being typical.

The present invention also contemplates the use of photographic elements of the present invention in what are often referred to as single use cameras (or "film with lens" units). These cameras are sold with film preloaded in them and the entire camera is returned to a processor with the exposed film remaining inside the camera. Such cameras may have glass or plastic lenses through which the photographic element is exposed.

In the following discussion of suitable materials for use in elements of this invention, reference will be made to *Research Disclosure,* September 1994, Number 365, Item 36544, which will be identified hereafter by the term "Research Disclosure I." The Sections hereafter referred to are Sections of the Research Disclosure I unless otherwise indicated. All Research Disclosures referenced are published by Kenneth Mason Publications, Ltd., Dudley Annex, 12a North Street, Emsworth, Hampshire P010 7DQ, ENGLAND. The foregoing references and all other references cited in this application, are incorporated herein by reference.

The silver halide emulsions employed in the photographic elements of the present invention may be negative working, such as surface sensitive emulsions or unfogged internal latent image forming emulsions, or positive working emulsions of internal latent image forming emulsions (that are either fogged in the element or fogged during processing). Suitable emulsions and their preparation as well as methods of chemical and spectral sensitization are described in Sections I through V. Color materials and development modifiers are described in Sections V through XX. Vehicles which can be used in the photographic elements are described in Section II, and various additives such as brighteners, antifoggants, stabilizers, light absorbing and scattering materials, hardeners, coating aids, plasticizers, lubricants and matting agents are described, for example, in Sections VI through XIII. Manufacturing methods are described in all of the sections, layer arrangements particularly in Section XI, exposure alternatives in Section XVI, and processing methods and agents in Sections XIX and XX.

With negative working silver halide a negative image can be formed. Optionally a positive (or reversal) image can be formed although a negative image is typically first formed.

The photographic elements of the present invention may also use colored couplers (e.g. to adjust levels of interlayer correction) and masking couplers such as those described in EP 213 490; Japanese Published Application 58-172,647; U.S. Pat. No. 2,983,608; German Application DE 2,706, 117C; U.K. Patent 1,530,272; Japanese Application A-113935; U.S. Pat. No. 4,070,191 and German Application DE 2,643,965. The masking couplers may be shifted or blocked.

The photographic elements may also contain materials that accelerate or otherwise modify the processing steps of bleaching or fixing to improve the quality of the image. Bleach accelerators described in EP 193 389; EP 301 477; U.S. Pat. Nos. 4,163,669; 4,865,956; and 4,923,784 are particularly useful. Also contemplated is the use of nucleating agents, development accelerators or their precursors (UK Patent 2,097,140; U.K. Patent 2,131,188); electron transfer agents (U.S. Pat. Nos. 4,859,578; 4,912,025); antifogging and anti color-mixing agents such as derivatives of hydroquinones, aminophenols, amines, gallic acid; catechol; ascorbic acid; hydrazides; sulfonamidophenols; and non color-forming couplers.

The elements may also contain other filter dye layers comprising colloidal silver sol or yellow and/or magenta filter dyes and/or antihalation dyes (particularly in an undercoat beneath all light sensitive layers or in the side of the support opposite that on which all light sensitive layers are located) either as oil in water dispersions, latex dispersions or as solid particle dispersions. Additionally, they may be used with "smearing" couplers (e.g. as described in U.S. Pat. No. 4,366,237; EP 096 570; U.S. Pat. Nos. 4,420,556; and 4,543,323.) Also, the couplers may be blocked or coated in protected form as described, for example, in Japanese Application 61/258,249 or U.S. Pat. No. 5,019,492.

The photographic elements may further contain other image-modifying compounds such as "Developer Inhibitor-Releasing" compounds (DIR's). Useful additional DIR's for elements of the present invention, are known in the art and examples are described in U.S. Pat. Nos. 3,137,578; 3,148, 022; 3,148,062; 3,227,554; 3,384,657; 3,379,529; 3,615, 506; 3,617,291; 3,620,746; 3,701,783; 3,733,201; 4,049, 455; 4,095,984; 4,126,459; 4,149,886; 4,150,228; 4,211, 562; 4,248,962; 4,259,437; 4,362,878; 4,409,323; 4,477, 563; 4,782,012; 4,962,018; 4,500,634; 4,579,816; 4,607, 004; 4,618,571; 4,678,739; 4,746,600; 4,746,601; 4,791, 049; 4,857,447; 4,865,959; 4,880,342; 4,886,736; 4,937, 179; 4,946,767; 4,948,716; 4,952,485; 4,956,269; 4,959, 299; 4,966,835; 4,985,336 as well as in patent publications GB 1,560,240; GB 2,007,662; GB 2,032,914; GB 2,099, 167; DE 2,842,063, DE 2,937,127; DE 3,636,824; DE 3,644,416 as well as the following European Patent Publications: 272,573; 335,319; 336,411; 346, 899; 362, 870; 365,252; 365,346; 373,382; 376,212; 377,463; 378,236; 384,670; 396,486; 401,612; 401,613.

DIR compounds are also disclosed in "Developer-Inhibitor-Releasing (DIR) Couplers for Color Photography," C. R. Barr, J. R. Thirtle and P. W. Vittum in *Photographic Science and Engineering,* Vol. 13, p. 174 (1969), incorporated herein by reference.

It is also contemplated that the concepts of the present invention may be employed to obtain reflection color prints as described in *Research Disclosure,* November 1979, Item 18716, available from Kenneth Mason Publications, Ltd, Dudley Annex, 12a North Street, Emsworth, Hampshire P0101 7DQ, England, incorporated herein by reference. The emulsions and materials to form elements of the present invention, may be coated on pH adjusted support as described in U.S. Pat. No. 4,917,994; with epoxy solvents (EP 0 164 961); with additional stabilizers (as described, for example, in U.S. Pat. Nos. 4,346,165; 4,540,653 and 4,906, 559); with ballasted chelating agents such as those in U.S. Pat. No. 4,994,359 to reduce sensitivity to polyvalent cations such as calcium; and with stain reducing compounds such as described in U.S. Pat. Nos. 5,068,171 and 5,096,805. Other compounds useful in the elements of the invention are disclosed in Japanese Published Applications 83-09,959; 83-62,586; 90-072,629, 90-072,630; 90-072,632; 90-072, 633; 90-072,634; 90-077,822; 90-078,229; 90-078,230;

90-079,336; 90-079,338; 90-079,690; 90-079,691; 90-080, 487; 90-080,489; 90-080,490; 90-080,491; 90-080,492; 90-080,494; 90-085,928; 90-086,669; 90-086,670; 90-087, 361; 90-087,362; 90-087,363; 90-087,364; 90-088,096; 90-088,097; 90-093,662; 90-093,663; 90-093,664; 90-093, 665; 90-093,666; 90-093,668; 90-094,055; 90-094,056; 90-101,937; 90-103,409; 90-151,577.

The silver halide used in the photographic elements may be silver iodobromide, silver bromide, silver chloride, silver chlorobromide, silver chloroiodobromide, and the like. For example, the silver halide used in the photographic elements of the present invention may contain at least 90% silver chloride or more (for example, at least 95%, 98%, 99% or 100% silver chloride). In the case of such high chloride silver halide emulsions, some silver bromide may be present but typically substantially no silver iodide. Substantially no silver iodide means the iodide concentration would be no more than 1%, and preferably less than 0.5 or 0.1%. In particular, in such a case the possibility is also contemplated that the silver chloride could be treated with a bromide source to increase its sensitivity, although the bulk concentration of bromide in the resulting emulsion will typically be no more than about 2 to 2.5% and preferably between about 0.6 to 1.2% (the remainder being silver chloride). The foregoing % figures are mole %.

The type of silver halide grains preferably include polymorphic, cubic, and octahedral. The grain size of the silver halide may have any distribution known to be useful in photographic compositions, and may be either poly-dipersed or monodispersed.

Tabular grain silver halide emulsions may also be used. Tabular grains are those with two parallel major faces each clearly larger than any remaining grain face and tabular grain emulsions are those in which the tabular grains account for at least 30 percent, more typically at least 50 percent, preferably $\geq 70$ percent and optimally >90 percent of total grain projected area. The tabular grains can account for substantially all (>97 percent) of total grain projected area. The tabular grain emulsions can be high aspect ratio tabular grain emulsions—i.e., ECD/t>8, where ECD is the diameter of a circle having an area equal to grain projected area and t is tabular grain thickness; intermediate aspect ratio tabular grain emulsions—i.e., ECD/t=5 to 8; or low aspect ratio tabular grain emulsions—i.e., ECD/t=2 to 5. The emulsions typically exhibit high tabularity (T), where T (i.e., ECD/$t^2$)>25 and ECD and t are both measured in micrometers (mm). The tabular grains can be of any thickness compatible with achieving an aim average aspect ratio and/or average tabularity of the tabular grain emulsion. Preferably the tabular grains satisfying projected area requirements are those having thicknesses of <0.3 mm, thin (<0.2 mm) tabular grains being specifically preferred and ultrathin (<0.07 mm) tabular grains being contemplated for maximum tabular grain performance enhancements. When the native blue absorption of iodohalide tabular grains is relied upon for blue speed, thicker tabular grains, typically up to 0.5 mm in thickness, are contemplated.

High iodide tabular grain emulsions are illustrated by House U.S. Pat. No. 4,490,458, Maskasky U.S. Pat. No. 4,459,353 and Yagi et al EPO 0 410 410.

Tabular grains formed of silver halide(s) that form a face centered cubic (rock salt type) crystal lattice structure can have either {100} or {111} major faces. Emulsions containing {111} major face tabular grains, including those with controlled grain dispersities, halide distributions, twin plane spacing, edge structures and grain dislocations as well as adsorbed {111} grain face stabilizers, are illustrated in those references cited in *Research Disclosure I*, Section I.B.(3) (page 503).

The silver halide grains to be used in the invention may be prepared according to methods known in the art, such as those described in *Research Disclosure I* and James, *The Theory of the Photographic Process*. These include methods such as ammoniacal emulsion making, neutral or acidic emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation.

The silver halide to be used in the invention may be advantageously subjected to chemical sensitization with noble metal (for example, gold) sensitizers, middle chalcogen (for example, sulfur) sensitizers, reduction sensitizers and others known in the art. Compounds and techniques useful for chemical sensitization of silver halide are known in the art and described in *Research Disclosure I* and the references cited therein.

The photographic elements of the present invention, as is typical, provide the silver halide in the form of an emulsion. Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like), and others as described in *Research Disclosure I*. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in *Research Disclosure I*. The vehicle can be present in the emulsion in any amount useful in photographic emulsions. The emulsion can also include any of the addenda known to be useful in photographic emulsions. These include chemical sensitizers, such as active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 5 to 8, and temperatures of from 30 to 80° C., as described in *Research Disclosure I*, Section IV (pages 510–511) and the references cited therein.

The silver halide may be sensitized by sensitizing dyes by any method known in the art, such as described in *Research Disclosure I*. The dye may be added to an emulsion of the silver halide grains and a hydrophilic colloid at any time prior to (e.g., during or after chemical sensitization) or simultaneous with the coating of the emulsion on a photographic element. The dyes may, for example, be added as a solution in water or an alcohol. The dye/silver halide emulsion may be mixed with a dispersion of color image-forming coupler immediately before coating or in advance of coating (for example, 2 hours).

Photographic elements of the present invention are preferably imagewise exposed using any of the known techniques, including those described in *Research Disclosure I*, section XVI. This typically involves exposure to light in the visible region of the spectrum, and typically such exposure is of a live image through a lens, although exposure can also be exposure to a stored image (such as a computer stored image) by means of light emitting devices (such as light emitting diodes, CRT and the like).

Photographic elements comprising the composition of the invention can be processed in any of a number of well-known photographic processes utilizing any of a number of well-known processing compositions, described, for example, in Research Disclosure I, or in T. H. James, editor, The Theory of the Photographic Process, 4th Edition, Macmillan, N.Y., 1977. In the case of processing a negative working element, the element is treated with a color developer (that is one which will form the colored image dyes with the color couplers), and then with a oxidizer and a solvent to remove silver and silver halide. In the case of processing a reversal color element, the element is first treated with a black and white developer (that is, a developer which does not form colored dyes with the coupler compounds) followed by a treatment to fog silver halide (usually chemical fogging or light fogging), followed by treatment with a color developer. Preferred color developing agents are p-phenylenediamines. Especially preferred are:

4-amino N,N-diethylaniline hydrochloride,
4-aamino-3-methyl-N,N-diethylaniline hydrochloride,
4-amino-3-methyl-N-ethyl-N-(b-(methanesulfonaamido) ethylaniline sesquisulfate hydrate,
4-amino-3-methyl-N-ethyl-N-(b-hydroxyethyl)aniline sulfate,
4-amino-3-b-(methanesulfonamido)ethyl-N,N-diethylaniline hydrochloride and
4-amino-N-ethyl-N-(2-methoxyethyl)-m-toluidine di-p-toluene sulfonic acid.

Development is followed by bleach-fixing, to remove silver or silver halide, washing and drying.

The following procedures were used to evaluate hydrophilic colloid compositions, as described in the examples set forth below.

Description of Viscosity Measurement

To monitor the influence of borate or boronic acid containing polymers on a gelatin melt during the hardening process, a Brookfield Viscometer (DV-II) equipped with a sample chamber consisting of two concentric cylinders (SC4-18 spindle and an R3 chamber) was used. The viscosity was monitored at constant temperature (40° C.) and shear rate (39.6 sec.-1). With this apparatus, the viscosity of a gelatin melt as a function of time following the addition of a hardener could be measured.

Sample solutions were prepared by combining gelatin (lime processed gelatin or "LPO" gelatin) and water to an aim of 5 wt. % gelatin in the final solution. The borate containing compound was added to the sample solution from a previously prepared –10 wt. %. aqueous solution. The amount of the borate polymer solution added to the melt depended upon the borate concentration range desired. Typical amounts of borate polymer used varied from 0–1 wt. % polymer in the final sample melt (or 0–20 wt. % borate containing polymer with respect to gelatin).

Just prior to measurement, the hardener was added to the sample and placed in the viscometer chamber. The hardener was added from an aqueous solution as described (1.8 wt. % aqueous solution for BVSM, 1 wt. % solution for BVSAE, and 2 wt. % solution for all other hardeners such as BVSME) to produce a final sample melt concentration of 0.12 wt. % (or 2 wt. % with respect to gelatin). Viscosity measurements were taken periodically at intervals depending upon the rate of viscosity increase.

The collected data was characterized by defining 4 values, (gel time, reaction rate parameter, initial viscosity and the change in viscosity. The gel time is the point when the solution reaches an infinite viscosity, measured at the x-intercept when plotting I/viscosity versus time. The reaction rate parameter is the initial rate at which the viscosity increases as a function of time, measured as the absolute value of the slope of the linear region of the 1/viscosity versus time curve. The initial viscosity was measured at the first data point taken. The change in viscosity is the difference in the initial viscosity when adding the polymer additive compared to when no polymer is added. The reaction rate parameter gives information regarding the rate of the hardening reaction, the viscosity measurements yield values that relate to the influence of the borate polymer to thicken the melt. The gel time results from a combination of the change in initial viscosity and the rate of the hardening reaction.

Description of Wet Scratch Resistance:

The wet scratch resistance of a gelatin coating was measured by submerging the sample coating (or photographic film) in a swelling agent. The swelling agent in this study was a photographic developer solution. The temperature was held constant at 39° C. A spherical-jewel stylus is dragged across the swollen sample while the normal load linearly increases with the distance dragged. At some distance along the sample, a scratch will form. The point where the scratch forms when observed by the naked eye is taken as the wet scratch resistance or the "grams to plow".

The following examples illustrate the invention.

EXAMPLE 1

Lime processed gelatin was added to a reaction vessel. The gelatin was melted by heating to a temperature of 35–40° C. A solution of polymer P-1 was added to the test solutions to provide a solution containing 5 wt. % of P-1, based on the weight of the gelatin. Doubly distilled water was added to make a 5 wt. % gelatin solution. Several chemical hardeners were added to at various concentrations (based on the weight of gelatin). The concentrations for each solution are given in Table 1 below. The viscosity as a function of time was measured as outlined previously.

TABLE 1

Results for samples of Polymer P-1 and Various chemical hardeners..

| Type of Chemical Crosslinker | Conc'n of hardener (wt. % to gelatin) | P-1 Conc'n (wt. % to gelatin) | Gel time (min.) | Reaction Rate Parameter (cps × min.)$^{-1}$ | Initial Viscosity (cps) | Change Viscosity by adding P-1 (cps) |
|---|---|---|---|---|---|---|
| Systems which yield hardening enhancement (decreased gel time and/or an increased reaction rate parameter by adding polymer) | | | | | | |
| BVSM | 2 | 0 | 433.9 | $3.9 \times 10^{-4}$ | 6.4 | 0 |
| BVSM | 2 | 5 | 153.7 | $4.9 \times 10^{-4}$ | 14.8 | 8.4 |
| BVSME | 2 | 0 | 1481.9 | $9.0 \times 10^{-5}$ | 7.7 | 0 |
| BVSME | 2 | 5 | 839.6 | $8.0 \times 10^{-5}$ | 14.4 | 6.7 |
| BVSAE | 2 | 0 | 3768.9 | $3.7 \times 10^{-5}$ | 6.8 | 0 |
| BVSAE | 2 | 5 | 4074.4 | $2.2 \times 10^{-5}$ | 14.9 | 8.1 |
| CH-1 | 2 | 0 | 386.3 | $3.2 \times 10^{-4}$ | 8 | 0 |
| CH-1 | 2 | 5 | 136 | $4.8 \times 10^{-4}$ | 14.5 | 6.5 |
| CH-1 | 2.5 | 0 | 234.8 | $5.1 \times 10^{-4}$ | 8.4 | 0 |
| CH-1 | 2.5 | 5 | 100.8 | $6.2 \times 10^{-4}$ | 16.2 | 7.8 |
| PYR-1 | 2 | 0 | 156.7 | $7.9 \times 10^{-4}$ | 7.7 | 0 |
| PYR-1 | 2 | 5 | 37.2 | $1.8 \times 10^{-3}$ | 14.5 | 6.8 |
| Systems which show thickening (increased viscosity and a positive change in viscosity by adding polymer) | | | | | | |
| PH-23 | 20 | 0 | 157.5 | $2.3 \times 10^{-4}$ | 27.6 | 0 |
| PH-23 | 20 | 5 | 161 | $1.5 \times 10^{-4}$ | 44.8 | 17.2 |
| triazine* | 2 | 0 | 2925.3 | $4.0 \times 10^{-5}$ | 8 | 0 |
| triazine* | 2 | 5 | 3739.6 | $2.0 \times 10^{-5}$ | 13 | 5 |

*the triazine hardener used was dichloro hydroxy triazine

The results reported in Table 1 show the advantage of using a water soluble polymer of boric acid in accordance with this invention. All compositions showed an increase in viscosity when Polymer P-1 is present. All compositions containing a hardener, except those containing a triazine hardener showed and improved rate of hardening when Polymer P-1 was present.

EXAMPLE 2

Lime processed gelatin was added to a reaction vessel. The gelatin was melted by heating to a temperature of 35–40° C. A solution of Polymer P-5 was added to the test solution to provide a solution containing 5 wt.% P-5, based on the weight of the gelatin. Doubly distilled water was added to make a 5 wt. % gelatin solution. Several chemical hardeners were added to at various concentrations (based on the weight of gelatin). The concentrations for each solution are given in Table 2, below. The viscosity as a function of time was measured as outlined previously.

TABLE 2

Results for samples of Polymer P-5 and various chemical hardeners

| Type of Chemical Crosslinker | Conc'n of crosslinker (wt. % to gelatin) | P-5 Conc'n (wt. % to gelatin) | Gel time (min.) | Reaction Rate Parameter (cps × min.)$^{-1}$ | Initial Viscosity (cps) | Change in Viscosity by adding P-5 (cps) |
|---|---|---|---|---|---|---|
| BVSM | 2 | 0 | 433.9 | $3.9 \times 10^{-4}$ | 6.4 | 0 |
| BVSM | 2 | 5 | 198.9 | $6.0 \times 10^{-4}$ | 10.1 | 3.7 |

EXAMPLE 3

Lime processed gelatin was added to a reaction vessel. The gelatin was melted by heating to a temperature of 35–40° C. A solution of Polymer P-1 was added to the test solutions to provide 5 wt.% of Polymer P-1, based on the weight of the gelatin. Doubly distilled water was added to make a 5 wt. % gelatin solution. The hardener BVSM was added in an amount to provide 2 wt. %, based on the weight of gelatin. Additionally, the pH of the solution was adjusted to a pH of 8.3 using sodium hydroxide. The concentrations for each solution are given in Table 3 below. The viscosity as a function of time was measured as outlined previously.

TABLE 3

Results for samples of Polymer P-1 and various chemical hardeners adjusted to pH = 8.3.

| Type of Chemical Crosslinker | Melt pH | Conc'n crosslinker (wt. % to gelatin) | P-1 Conc'n (wt. % to gelatin) | Gel time (min.) | Reaction Rate Parameter (cps × min.)$^{-1}$ | Initial Viscosity (cps) | Change in Viscosity by adding P-1 (cps) |
|---|---|---|---|---|---|---|---|
| BVSM | 5.5 | 2 | 0 | 433.9 | $3.9 \times 10^{-4}$ | 6.4 | 0 |
| BVSM | 5.5 | 2 | 5 | 198.9 | $6.0 \times 10^{-4}$ | 10.1 | 3.7 |
| BVSM | 8.3 | 2 | 5 | 16 | 251.3 | 26.4 | 20 |

EXAMPLE 4

Lime processed gelatin was added to a reaction vessel. The gelatin was melted by heating to a temperature of 35–40° C. A solution of Polymer P-1 was added to the test solutions to a concentration of 2 wt.%, based on the weight of the gelatin. A thickener poly styrene sulfonate (PSS) was added to the test soltuions to provide a concentration of 2 or 5 wt %, as reported in Table 4. Doubly distilled water was added to make a 5 wt. % gelatin solution. BVSM was added to provide a concentration of 2 wt.% with respect to the gelatin. The concentrations for each solution are given in Table 4 below. The viscosity as a function of time was measured as outlined previously.

TABLE 4

Results for samples of Polymer P-1 and various chemical hardeners.

| Thickener | Thickener Conc'n (wt. %) | P-1 (50/50) Conc'n (wt. % to gelatin) | Gel time (min.) | Reaction Rate Parameter (cps × min.)$^{-1}$ | Initial Viscosity (cps) | Change in Viscosity by adding P-1 (cps) |
|---|---|---|---|---|---|---|
| none | 0 | 0 | 433.9 | $3.9 \times 10^{-4}$ | 6.4 | 0 |
| none | 0 | 5 | 153.7 | $4.9 \times 10^{-4}$ | 14.8 | 8.4 |
| PSS | 2 | 5 | 197.2 | $3.8 \times 10^{-4}$ | 13.3 | 6.9 |
| PSS | 5 | 5 | 100.8 | $3.8 \times 10^{-4}$ | 26.9 | 20.5 |

EXAMPLE 5

A photographic element was prepared with 4 layers including a gelatin overcoat containing the vinyl-sulfone hardener (BVSM), a layer containing a fast yellow dispersion with a total of 300 mg/sq. ft. (3230 mg/m2) gelatin, a layer containing a fast magenta dispersion with 300 mg/sq.ft (3230 mg/m2) gelatin, and a layer containing a fast cyan dispersion with 300 mg/sq. ft. (3290 mg/m2) gelatin. Polymer P-1 or Polymer P-5 was added to layer 4 containing the fast cyan dispersion in the amounts shown in Table 5.
COATING FORMAT
Layer 1:
  Overcoat—85 mg/ft$^2$ (915 mg/m$^2$) gelatin, 1 % a non-ylphenoxy polyglycerol surfactant (commercially available as Olin 10 G from Olin Corp.) 1.5% BVSM (relative to gel)
Layer 2:
  Fast Yellow Dispersion, 300 mg/ft$^2$ (3230 mg/m$^2$) gelatin
Layer 3:
  Fast Magenta Dispersion, 300 mg/ft$^2$ (3230 mg/m$^2$) gelatin
Layer 4:

Fast Cyan Dispersion, 300 mg/ft$^2$ (3230 mg/m$^2$) gelatin

Polymer P-1 or Polymer P-5 (amount specified in Table 5)

TABLE 5

Polymer P-1 or Polymer P-5 and concentration added to the fast cyan layer.

| Sample Identification | Polymer ratio | Polymer Concentration (mg/ft$^2$) |
|---|---|---|
| 5A | 0 | 0 |
| 5B | P-1 | 15 |
| 5C | P-1 | 30 |
| 5D | P-5 | 15 |
| 5E | P-5 | 30 |

Figure 1:
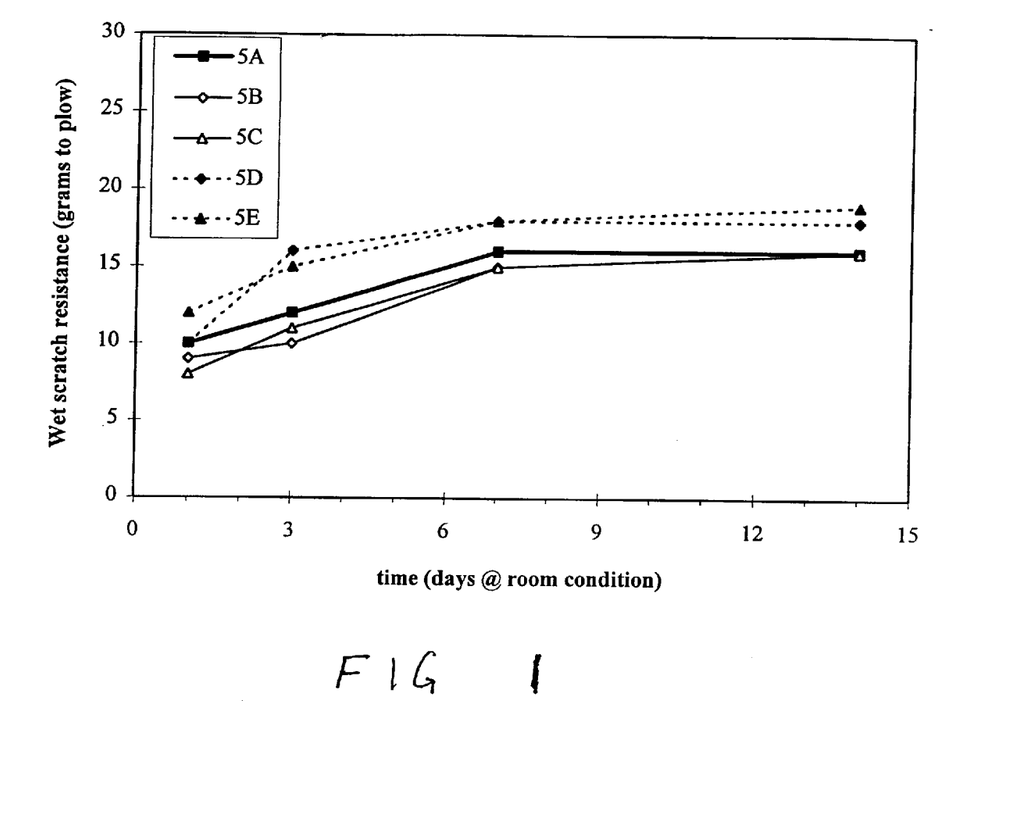
FIG. 1 is a graph showing the wet strength of various coatings, as described more fully in Example 5 below.

The resulting coatings were tested for wet strength using the procedure outlined previously. The results are presented in FIG. 1.

The invention has been described in detail with particular reference to preferred embodiments, but it will be understood that variations and modifications can be effected within the spirit and scope of the invention.

What is claimed is:

1. A photographic element comprising a support bearing at least one light sensitive layer and at least one other layer, wherein at least one of said layers comprises a hydrophilic colloid and a water soluble polymer of boric acid and at least one of said layers comprises a hardening agent for the hydrophilic colloid.

2. A photographic element according to claim 1, wherein the hydrophilic colloid is gelatin.

3. A photographic element according to claim 1, wherein the water soluble polymer of boric acid is of formula A:

(A)

wherein:
Y is

L is a divalent bonding group having from 1 to 12 carbon atoms;

R is a hydrogen atom or a substituted or unsubstituted alkyl group;
and
l, m, n are each independently 0 or 1.

4. A photographic element according to claim 1, wherein the hardener is a vinyl sulfone hardener.

5. A photographic element according to claim 4, wherein the vinyl sulfone hardener is bis(vinyl-sulfonyl) methane, bis(vinyl-sulfonyl methyl) ether, or 1,2-bis(vinyl-sulfonyl acetoamide)ethane.

6. A photographic element according to claim 4, wherein the vinyl sulfone hardener is a polymeric vinyl sulfone.

7. A photographic element according to claim 1, wherein the hardener is a carbamoyl- or carbamoyloxy-pyridinium hardener.

8. A photographic element according to claim 1, wherein the hardener is a pyridinium ether.

9. A method for preparing a photographic element which comprises coating a support with at least one layer comprising an aqueous medium containing a hydrophilic colloid and a polymer containing a water soluble polymer of boric acid and at least one other layer comprising a hydrophilic colloid, wherein at least one of said layers comprises a light sensitive silver halide emulsion, and at least one of said layers contains a hardener for said hydrophilic colloid.

* * * * *